(12) United States Patent  
Miki et al.

(10) Patent No.: US 7,388,969 B2  
(45) Date of Patent: Jun. 17, 2008

(54) METHOD OF MEASURING ROTATIONAL AMOUNT OF BODY HAVING CURVED SURFACE AND DIRECTION OF ROTATIONAL AXIS THEREOF, APPARATUS OF MEASURING ROTATIONAL AMOUNT THEREOF AND DIRECTION OF ROTATIONAL AXIS THEREOF, AND METHOD OF SPECIFYING THREE-DIMENSIONAL POSTURE THEREOF

(75) Inventors: Mitsunori Miki, Kyoto (JP); Masahiko Ueda, Hyogo (JP); Masahide Onuki, Hyogo (JP)

(73) Assignees: SRI Sports Limited, Kobe (JP); Mitsunori Miki, Kyoto (JP)

( * ) Notice: Subject to any disclaimer, the term of this patent is extended or adjusted under 35 U.S.C. 154(b) by 793 days.

(21) Appl. No.: 10/453,526

(22) Filed: Jun. 4, 2003

(65) Prior Publication Data  
US 2003/0228070 A1    Dec. 11, 2003

(30) Foreign Application Priority Data  
Jun. 6, 2002    (JP) ............................. 2002-166022  
Oct. 10, 2002    (JP) ............................. 2002-297939

(51) Int. Cl.  
*G06K 9/00*    (2006.01)

(52) U.S. Cl. ...................................... 382/107; 382/103

(58) Field of Classification Search ................ 382/103, 382/107  
See application file for complete search history.

(56) References Cited

U.S. PATENT DOCUMENTS 5,471,383 A * 11/1995 Gobush et al. ............... 700/91  
6,042,483 A * 3/2000 Katayama ................... 473/199  
6,072,496 A * 6/2000 Guenter et al. ............. 345/419  
6,097,472 A * 8/2000 Tanaka et al. ................ 355/47  
6,226,416 B1 * 5/2001 Ohshima et al. ............ 382/289

FOREIGN PATENT DOCUMENTS

| JP | 06-052316 | * | 2/1994 |
| JP | 07-286837 | * | 10/1995 |
| JP | 07-302341 | * | 11/1995 |
| JP | 7-302341 A | | 11/1995 |
| JP | 10-186474 A | | 7/1998 |
| JP | 2810320 B2 | | 7/1998 |
| JP | 2950450 B2 | | 7/1999 |

* cited by examiner

*Primary Examiner*—Matthew C. Bella  
*Assistant Examiner*—Randolph Chu  
(74) *Attorney, Agent, or Firm*—Birch, Stewart, Kolasch & Birch, LLP

(57) ABSTRACT

A method of measuring of the present invention includes the steps of photographing a rotating body with the curved surface having marks to obtain two-dimensional images thereof; generating a three-dimensional imaginary body with the curved surface having marks; setting an arbitrary posture of the imaginary body as a reference posture, performing a posture displacement operation in such a way that the marks of the imaginary body are coincident with the marks of the body; specifying a three-dimensional posture of the body on the basis of an amount of the posture displacement operation relative to the reference posture; and determining the rotational amount of the body and the direction of the rotational axis thereof by computing a rotation matrix relating to a rotation operation to make the three-dimensional posture of the body at one time coincident with that at another time.

7 Claims, 13 Drawing Sheets

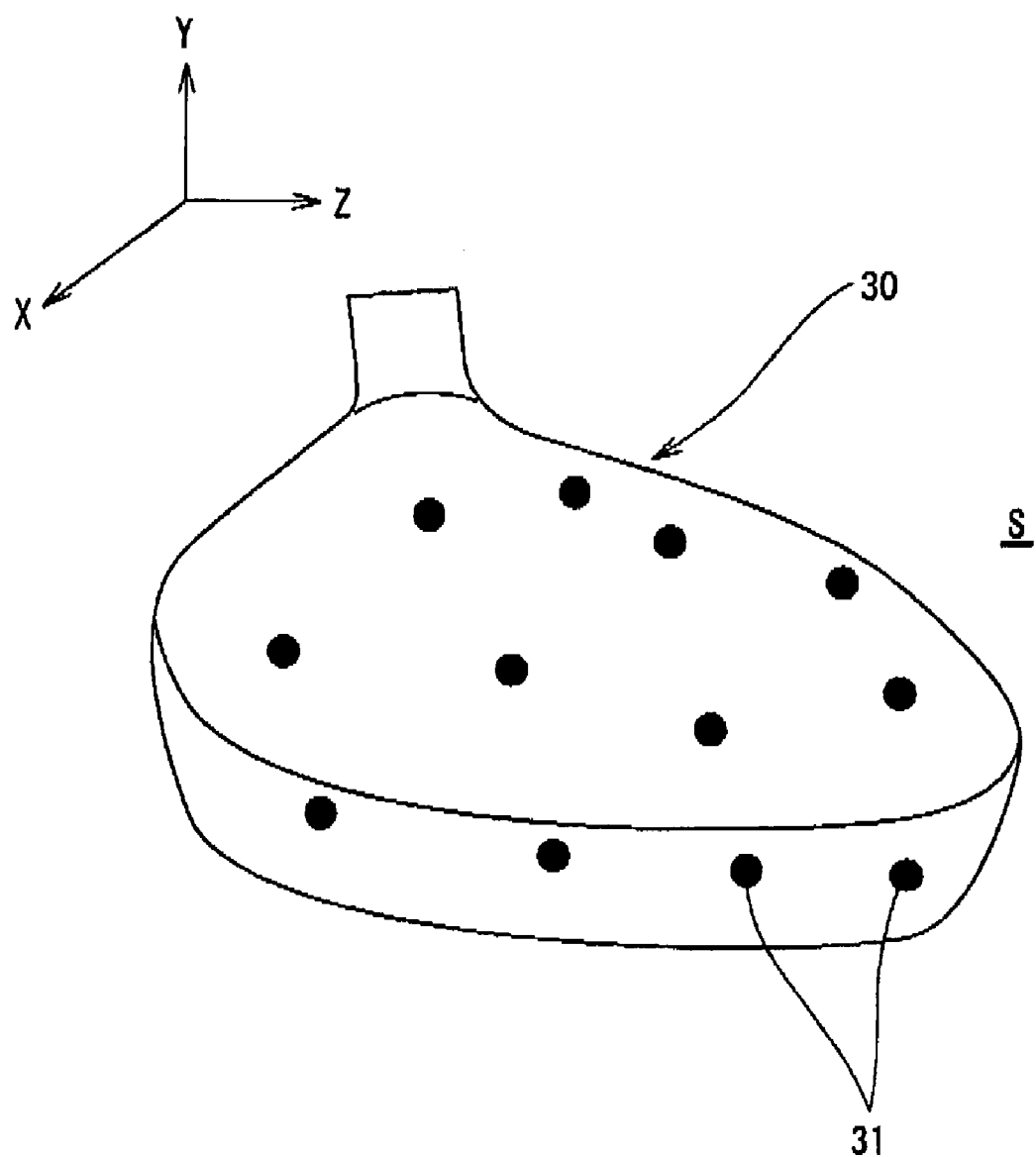

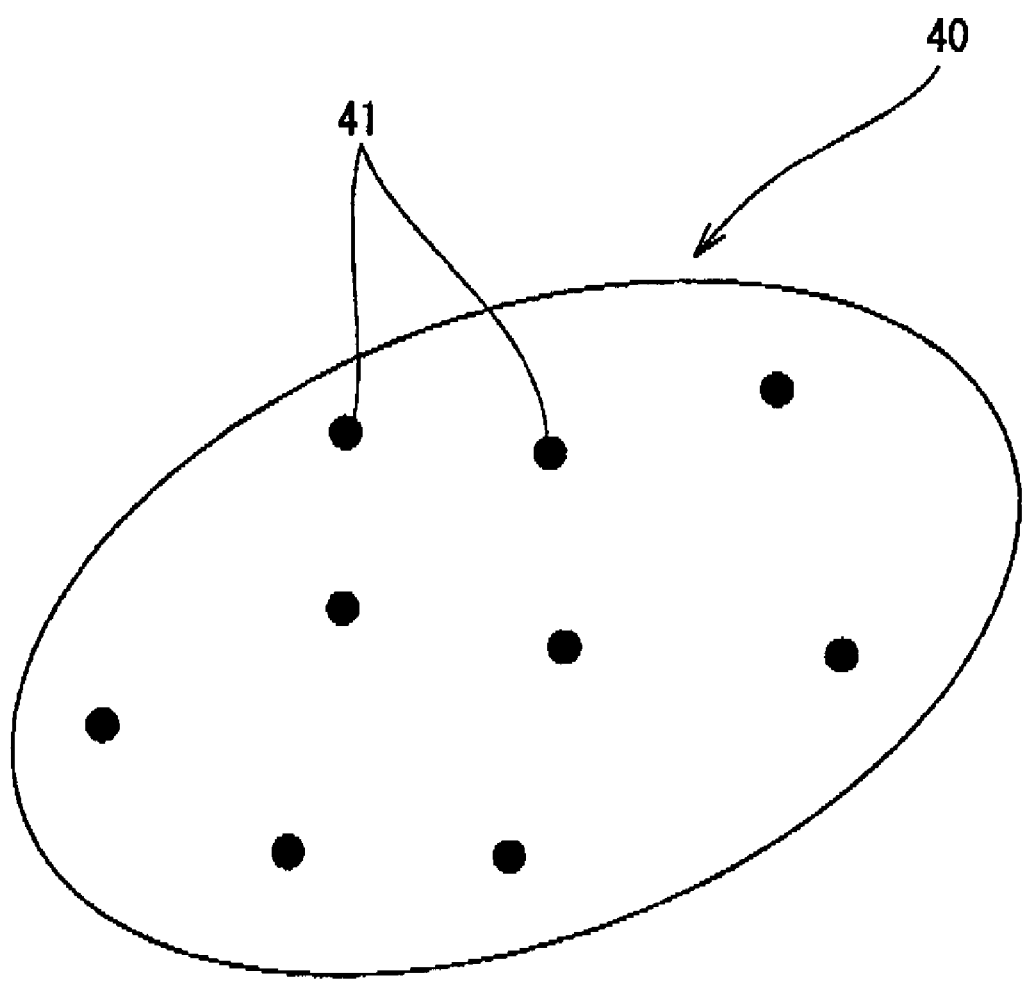

METHOD OF MEASURING ROTATIONAL AMOUNT OF BODY HAVING CURVED SURFACE AND DIRECTION OF ROTATIONAL AXIS THEREOF, APPARATUS OF MEASURING ROTATIONAL AMOUNT THEREOF AND DIRECTION OF ROTATIONAL AXIS THEREOF, AND METHOD OF SPECIFYING THREE-DIMENSIONAL POSTURE THEREOF

BACKGROUND OF THE INVENTION

1. Field of the Invention

The present invention relates to a method of measuring a rotational amount of a body with a curved surface and a direction of a rotational axis thereof; an apparatus for measuring the rotational amount thereof and the direction of the rotational axis thereof; and a method of measuring a three-dimensional posture thereof. More particularly the present invention relates to the method of measuring the rotational amount and the like of the body with a curved surface such as a golf club head, a rugby ball, a bullet of a pistol, and the like with high accuracy by specifying the three-dimensional posture thereof.

2. Description of the Related Art

Various methods and apparatuses for measuring the rotational amount and the like of spheres such as a golf ball are known.

According to a known method, light is emitted to a sphere having a reflection tape bonded to its surface or to a sphere having a region, painted in black on its surface, not reflecting light therefrom to measure the rotational amount of the sphere from a change in the amount of reflection light obtained by the rotation of the sphere. However according to this method, since the optical amount is measured, whereas the contour of the sphere and the displacement of its posture are not measured, it is impossible to specify the direction of the rotational axis and the like of the sphere. Thus normally, the rotational amount of the sphere and the direction of its rotational axis are found from a displacement situation of marks given to each of a plurality of images of a sphere photographed at predetermined intervals when the sphere having the marks on its surface is flying in rotation.

As apparatuses and methods of finding the rotational amount and the like of the sphere from images of a photographed mark-given sphere, the following measuring apparatuses and methods are known: The apparatus for measuring the rotational amount of the sphere disclosed in U.S. Pat. No. 2,810,320, the method of measuring the motion of a golf club head disclosed in Japanese Patent Application Laid-Open No. 10-186474, and the apparatus for measuring the flight characteristic of sporting goods disclosed in U.S. Pat. No. 2,950,450.

In the measuring apparatus disclosed in U.S. Pat. No. 2,810,320, as shown in FIGS. 10A and 10B, the sphere T, having the center C, to which the marks P and Q are given is photographed twice to obtain two two-dimensional images G1 and G2, and the radius of the sphere in each of the two-dimensional images G1 and G2 is specified as the unit radius. Further the three-dimensional coordinate of each of the marks P and Q and the center C is computed from the two-dimensional coordinate on the two-dimensional image G1. The three-dimensional coordinate of each of the marks P' and Q' and the center C' is also computed from the two-dimensional coordinate on the two-dimensional image G2. These computed three-dimensional coordinates are set as three-dimensional vectors to find the vector movement amount between the two images G1 and G2 to thereby compute the rotational amount of the sphere T and the direction of its rotational axis.

As shown in FIGS. 11A and 11B, in the measuring method disclosed in Japanese Patent Application Laid-Open No. 10-186474, the sensor 2 that detects the motion of a club when it hits the ball B1 is used to determine a photographing timing. The ball B1 is photographed at a predetermined interval by the first and second cameras 1A and 1B. Thereby as shown in FIG. 11B, the ball image G3 having the two balls B1 and B1' photographed thereon is obtained. The two-dimensional ball image G3 is processed by the method similar to that of the measuring apparatus disclosed in U.S. Pat. No. 2,810,320 to compute the rotational amount and the direction of its rotational axis.

With reference to FIGS. 12A and 12B, in the measuring apparatus 4 disclosed in U.S. Pat. No. 2,950,450, the balls B2 and B2' to which the marks Ba have been given are photographed by the synchronized cameras 5A and 5B to provide one picture in which the image of each of the balls B2 and B2' is present. The three-dimensional coordinate of the mark Ba is obtained based on a principle similar to the triangulation by relating the principle to the relationship between the visual field of the camera 5A and that of the camera 5B. Thereby as shown in FIG. 12B, a view of the three-dimensional region of the balls B2 and B2' is obtained to measure the characteristics of the ball. The method of obtaining the three-dimensional coordinate in this manner is known as DLT (Direct Liner Transformation).

In addition to the above-described apparatuses and method, the apparatus 6 for detecting the posture of an unspherical three-dimensional object is disclosed in Japanese Patent Application Laid-Open No. 7-302341, as shown in FIG. 13. The posture detection apparatus 6 measures the posture of the three-dimensional object, based on a genetic algorithm. That is, a goodness-of-fit is found by comparing a plurality of images of the three-dimensional object 8 photographed with a plurality of cameras 7a-7n with a plurality of imaginary images of the imaginary three-dimensional object 9 formed in correspondence to the three-dimensional object 8. Based on the genetic algorithm conforming to the goodness-of-fit, the posture of the three-dimensional object 8 is detected by changing the posture of the imaginary three-dimensional object 9.

In the measuring apparatus shown in FIGS. 10A and 10B and the measuring method shown in FIGS. 11A and 11B, because the radius of the ball image is used in computations for measurement, the accuracy of the three-dimensional vector to be computed depends on the accuracy of the radii of the sphere obtained from the images. Thus it is necessary to highly accurately photograph the images on the basis of which the measurement is made and find the radius of the sphere with high accuracy from the photographed images. To obtain a still image of the ball flying at a high speed, it is necessary to use a high-speed camera having a high-speed shutter. However because the high-speed shutter opens in a very short period of time, it is difficult to obtain a sufficient amount of light.

The photographed ball image is comparatively clear in the vicinity of the center of the ball, because the center of the ball confronts the camera. On the other hand, it is difficult to clearly capture the contour of the ball. Even though the manner of emitting the ball is adjusted, it is difficult to solve this problem. Consequently the contour of the photographed image of the ball is unclear. Thus the radius of the ball is read with low accuracy from the ball image, which causes the rotational amount of the ball and the like to be measured with low accuracy.

In the measuring apparatus shown in FIGS. 12A and 12B, the three-dimensional coordinates of the marks given to the surface of the ball are obtained not by using the radius of the ball image but on the basis of the length of an actual space. Thus it is unnecessary to photograph the contour of the ball clearly and the problem of shortage of luminous intensity rarely occurs. Further measuring apparatus shown in FIGS. 12A and 12B has an advantage of reducing a burden on the measuring equipment. However to find the three-dimensional coordinates of the marks given to the surface of the ball with high accuracy, it is necessary to obtain images of the ball in a comparatively large size to allow the marks to be read accurately. To photograph the ball in a large size, it is necessary to obtain the two images of the ball by photographing it at a reduced interval, which reduces the rotational amount of one ball image with respect to that of the other ball image.

To measure the rotational amount of the ball with high accuracy, it is necessary to increase the moving distance of each mark to thereby increase the displacement of the position of the mark, i.e., increase the rotational amount of one ball image with respect to that of the other ball image, which necessitates a condition reciprocal to the increasing of the ball image.

Thus it is possible to measure the three-dimensional coordinates of the marks with high accuracy by increasing the ball image. However, because the change of the positions between both images is small, the rotational amount of the ball cannot be measured with high accuracy. In the case where the ball is photographed in such a way as to increase the rotational amount of the other ball image with respect to that of the one ball image, it is necessary to photograph the ball at a long interval. In this case, although the rotational amount of the ball can be measured with high accuracy, the ball images are small. Therefore the three-dimensional coordinates of the marks are measured with low accuracy. Thus the measuring apparatus is incapable of measuring both the three-dimensional coordinates of the marks and the rotational amount of the ball with high accuracy.

To solve the above-described problem, it is conceivable to prepare two sets of measuring apparatuses to obtain one image of the ball with a first measuring apparatus and the other image thereof with a second measuring apparatus to measure both the three-dimensional coordinate of each mark and the rotational amount of the ball with high accuracy. However in carrying out measurement, it is necessary to make a calibration by associating the operation of four cameras of both sets of the measuring apparatuses with each other. Furthermore the measuring apparatus is required to have a very complicated construction and is hence very expensive. As such, it is difficult to use two sets of the measuring apparatuses.

Further in computing the rotational amount of the ball from the movement amount of the mark given to the surface of the photographed ball, it is necessary to recognize a particular mark on the other ball image corresponding to the particular mark on the one ball image. In the case where the direction of the rotational axis of the ball can be estimated and the change of the rotational amount of the other ball image with respect to that of the one ball image is small, it is comparatively easy to recognize the particular mark on the other ball image corresponding to the particular mark on the one ball image. However in the case where the direction of the rotational axis of the ball cannot be estimated because the direction of the rotational axis of the ball changes greatly in each measurement or in the case where the change of the rotational amount of the other ball image with respect to that of the one ball image is large, it is very difficult to recognize the particular mark on the other ball image corresponding to the particular mark on the one ball image. In this case, there is a possibility that the rotational amount of the ball and the like cannot be measured by means of an automatic recognition program of a computer. In the case where a man recognizes the particular mark on the other ball image corresponding to the particular mark on the one ball image, it takes much time and may make an erroneous recognition of the mark.

In addition, it is impossible to make measurement in the case where the mark which has appeared on the one ball image rotates to the reverse side of the other ball image and does not appear on the surface thereof. In this case, there is a limitation in the measuring direction of the camera and the rotational direction of the ball. Thus the measuring apparatus has a problem of having difficulty in making measurement in an optimum situation.

In the posture detection apparatus 6 shown in FIG. 13, since a plurality of cameras 7a-7n is used, the measuring cost is high. The ball is symmetrical with respect to the axis passing through its center. Thus when the posture, namely, the direction of the ball changes, there is no change among the images of the ball photographed by the posture detection apparatus 6. That is, even though the ball images and the imaginary images are compared with each other, the posture of the ball cannot be specified. Further in the posture detection apparatus 6, the goodness-of-fit is determined on the basis of an overlapping degree of a plurality of images. Thus it is necessary to provide a clear contour of the ball image. However in the case where the posture of a body with the curved surface such as a golf club head which moves at a high speed is measured, it is difficult for the cameras 7a-7n to follow a high-speed movement of the body with the curved surface and photograph it. It is almost impossible that all images of the ball are clear. Because the goodness-of-fit is determined on the basis of images containing a considerable degree of errors, the posture detection apparatus 6 is incapable of measuring the posture of the ball with high accuracy.

The above-described conventional methods are intended to measure the rotational amount and the like of the sphere such as the golf ball, but are incapable of measuring the rotational amount and the like of a body with a curved surface such as a golf club head, a rugby ball, a bullet of a pistol, and the like.

SUMMARY OF THE INVENTION

The present invention has been made in view of the above-described problems. Thus it is an object of the present invention to determine the rotational amount and the like of a body with a curved surface with high accuracy by using a computer, without using data of the contour of the image thereof.

To achieve the object, there is provided a method of measuring a rotational amount of a body with a curved surface and a direction of a rotational axis thereof, comprising the steps of photographing at predetermined intervals the rotating body with the curved surface having a plurality of marks given to a surface thereof to obtain a plurality of two-dimensional images of the body with the curved surface; generating an imaginary body with the curved surface having a plurality of marks given to a surface thereof in a three-dimensional coordinate space by operating a computer; setting an arbitrary posture of the imaginary body with the curved surface as a reference posture, observing the imaginary body with the curved surface in an arbitrary viewing direction, and performing a posture displacement operation with the computer in such a way that the marks given to the imaginary body with the curved surface are coincident with the marks given to the surface of the body with the curved surface in each of the two-dimensional images; specifying a three-dimensional posture of the body with the curved surface for each of the two-dimensional images thereof on the basis of an amount of a posture displacement operation, relative to the reference posture and determining the rotational amount of the body with the curved surface and the direction of the rotational axis thereof by computing a matrix relating to a rotation operation to be performed in making the specified three-dimensional posture of the body with the curved surface at one time coincident with the three-dimensional posture of the body with the curved surface at another time.

As described above, according to the present invention, based on the two-dimensional image of the photographed rotating body with the curved surface, its rotational amount and the direction of its rotational axis can be easily determined by specifying the three-dimensional posture of the body with the curved surface in the imaginary three-dimensional space by the above-described method and computing the coordinate axis and the rotation angle of coordinate conversion making the three-dimensional posture of the body with the curved surface at one time coincident with the three-dimensional posture thereof at another time. The body with the curved surface means not a sphere but an object with a curved surface at least one portion thereof.

It is possible to express the position and posture of the actual body with the curved surface in terms of coordinate values relative to the reference posture in the imaginary three-dimensional space by relating the posture of the imaginary body with the curved surface and that of the actual body with the curved surface to each other. Consequently it is possible to use the coordinate value relative to the reference posture in the imaginary three-dimensional space in analyzing the rotational amount of the body with the curved surface and the direction of its rotational axis. Thereby the characteristic of the body with the curved surface such as its rotation can be automatically easily analyzed by the computer.

In the present invention, the posture of the body with the curved surface is specified on the basis of a plurality of marks given to the surface of the body with the curved surface in each of the two-dimensional images thereof obtained by photographing it, without using contour data of the body with the curved surface. It is possible to measure the posture and the like of the body with the curved surface with high accuracy so long as the marks given to the body with the curved surface can be clearly recognized in each of the two-dimensional images, even though the contour of the body with the curved surface is unclear. Further by specifying the posture of the body with the curved surface from one image, it is easy to photograph the dimension of the body with the curved surface in a magnified dimension. In the case where the image of the body with the curved surface is large, it is possible to reduce the degree of error in reading the marks on the surface of the body with the curved surface and relate the posture of the imaginary body with the curved surface and that of the body with the curved surface to each other with high accuracy. To allow the computer to automatically recognize the marks of the body with the curved surface from the two-dimensional image of the photographed body with the curved surface, it is conceivable to execute binarization of displaying it in only white and black.

More specifically, the rotational amount of the body with the curved surface is obtained by the product of a rotation matrix which the body with the curved surface has at one time and a reciprocal matrix of a rotation matrix which the body with the curved surface has at another time which can be specified in relation to the one time. It is easy to determine the rotational amount of the body with the curved surface by determining a numerical value of the rotation matrix specifying the posture of the body with the curved surface at another time from the posture thereof at the one time and also find the vector of its rotational axis, namely, the direction of its rotational axis.

The posture displacement operation means an operation of magnifying and minifying, moving, and rotating the imaginary body with the curved surface; and an amount of the posture displacement operation relative to the reference posture is found as an amount of the operation of magnifying and minifying, moving, and rotating the imaginary body with the curved surface by computations based on a genetic algorithm.

Because the reference posture of the imaginary body with the curved surface to be formed on the computer is set arbitrarily, there is a difference between the size, position, and posture of the imaginary body with the curved surface and those of the two-dimensional image obtained by photographing the body with the curved surface. To allow the posture of the body with the curved surface to be displayed by coordinate values relative to the reference position of the imaginary body with the curved surface in the imaginary space, it is necessary to perform the operation of displacing the posture of the imaginary body with the curved surface in such a way that the posture of the imaginary body with the curved surface is coincident with that of the two-dimensional image of the body with the curved surface.

As described above, the posture of the imaginary body with the curved surface is displaced by the operation of magnifying and minifying, moving, and rotating it on the display screen of the computer. It is possible to make the posture of the imaginary body with the curved surface coincident with that of the actual body with the curved surface correctly by appropriately determining the amount of the operation of magnifying and minifying, moving, and rotating the posture of the imaginary body with the curved surface. Consequently the posture of the body with the curved surface can be specified with high accuracy by the coordinate values relative to the reference posture. In the present invention, the determination of the amount of the operation of displacing the imaginary body with the curved surface is grasped as the problem of optimization, and computations are performed by using the genetic algorithm, for a computer, which is one of methods for solving the problem of optimization.

The genetic algorithm is used to apply the process in which an organism having an inherent genetic program in the form of a chromosome is altered by a reproduction, a selection, and a mutation and succeeded to the next generation to a method of artificially solving the problem of optimization.

More specifically, in the computation performed based on the genetic algorithm, variables of a large number of individuals forming the group of solutions are converged into an optimum solution by selecting an individual which can leave descendants to the next generation, based on a goodness-of-fit constituting a determination standard and by repeating, for a large number of generations, a reproduction process of a crossing-over of rearranging elements of arbitrary variables and a mutation of forcibly altering elements of the arbitrary variables.

A plurality of the marks are given to a surface of the body with the curved surface, with the marks symmetrical at not more than four times with respect to a rotational axis thereof in an operation of rotating the body with the curved surface.

A plurality of marks is given to positions of the surface of the body with the curved surface in such a way that when the body with the curved surface is rotated on the axis passing through the center thereof at an angle obtained by dividing 360 degrees by a natural number of four or less, all marks at the time before the rotation thereof are coincident with those at the time after the rotation thereof, supposing that the body with the curved surface is viewed in a certain direction.

In the case where a plurality of marks are given to the surface of the body with the curved surface in this manner, none of viewable marks before and after the rotation of the body with the curved surface are coincident with each other, when the body with the curved surface is rotated at an angle less than 90 degrees. Thus the number of the postures of the body with the curved surface can take is limited to a small number. According to the present invention, that all marks are coincident with each other before and after the rotation of the body with the curved surface at a certain angle when it is viewed in a certain direction is called (rotation) symmetry.

The angles obtained by dividing 360 degrees by the natural number of not more than four are 360 degrees, 180 degrees, 120 degrees, and 90 degrees. For example, symmetry at the rotation of 360 degrees means the case in which a plurality of marks are given at random to the entire surface of the body with the curved surface. In this case, symmetry occurs only once per rotation, and the posture of the body with the curved surface can be specified primarily. Thus computations can be accomplished with high accuracy. In the case where the body with the curved surface is rotated at 180 degrees, there are two positions of symmetry per rotation. Thus when the posture of the body with the curved surface is specified, two postures are present and thus the posture cannot be specified primarily. However the same pattern can be repeated, and marks can be given efficiently to the surface of the body with the curved surface. In the case where the body with the curved surface is rotated at 120 degrees, there are three positions of symmetry per rotation. In the case where the body with the curved surface is rotated at 90 degrees, there are four positions of symmetry per rotation. As such, the burden of giving marks to the surface of the body with the curved surface decreases stepwise.

If marks are given collectively to the surface of the body with the curved surface in the above-described manner, it is conceivable that there may be a case where the posture of the body with the curved surface cannot be specified because the marks become located at the rear side in a observation direction. Therefore not less than 10 marks nor more than 100 marks are given to the entire surface of the body with the curved surface. If the number thereof is less than 10, the number of marks that can be read in the observation direction is so small that there is a possibility that the posture of the body with the curved surface cannot be specified. On the other hand, if the number of the marks is more than 100, it takes long to perform computations, and thus computation efficiency becomes low.

The body with the curved surface that can be measured includes a golf club head, ellipses such as a rugby ball and an American football ball, a bullet of a pistol, and the like.

The imaginary body with the curved surface is observed in an arbitrarily set direction. The posture of the imaginary body with the curved surface is observed at the set observation direction before and after the posture displacement operation is performed. Since the imaginary body with the curved surface is observed in one direction, one picture of the body with the curved surface corresponding to the imaginary body with the curved surface suffices in specifying the posture of the imaginary body with the curved surface, and time and labor in photographing the actual body with the curved surface can be reduced.

The method of artificially solving the problem of optimization by using the computation based on the genetic algorithm has a characteristic different from other optimization methods such as a simulated annealing method, an inclination method, and the like. For example, the method of artificially solving the problem of optimization by using the computation based on the genetic algorithm has characteristics that a variable to be computed is coded to a binary number, a character string or a vector, and the like, and a goodness-of-fit for evaluating a computed result is set on the basis of an objective function.

The genetic algorithm is a probabilistic solving method of simultaneously searching an optimum solution from a large number of individuals by computations and is capable of optimizing a solution obtained by computations. Therefore the genetic algorithm is useful for making the posture of the imaginary body with the curved surface on the computer coincident with that of the body with the curved surface in the two-dimensional image with reference to a plurality of marks given to the body with the curved surface.

In the computation based on the genetic algorithm, the amount of the magnifying and minifying operation is set as one variable relating to the operation of magnifying and minifying the imaginary body with the curved surface, the amount of the moving operation is set as two independent variables relating to the operation of moving the imaginary body with the curved surface two-dimensionally, and the amount of the rotating operation is set as three independent variables relating to the operation of rotating the imaginary body with the curved surface three-dimensionally. Each of the operations is performed on the basis of the numerical value of each of the six variables. The six variables thus set correspond to the coordinate values relative to the reference posture. Therefore the posture of the body with the curved surface can be specified by finding the numerical value of each of the six variables.

A scale is given as one variable relating to the magnifying and minifying operation. A displacement of each of rectangular coordinates in a plane vertical to a direction in which the imaginary body with the curved surface is viewed is given as the two independent variables relating to the operation of moving the imaginary body with the curved surface two-dimensionally. A rotation angle of the imaginary body with the curved surface around each of the abscissa, the ordinate, and the vertical axis which are the rectangular coordinates of the imaginary three-dimensional coordinate space is given as the three independent variables relating to the operation of rotating the imaginary body with the curved surface three-dimensionally.

Not less than two kinds nor more than 1000 kinds of individuals each consisting of a group of the six variables are formed. These individuals are computed, based on the genetic algorithm.

In the present invention, by setting the group of the six variables as one individual, the solving method based on the genetic algorithm can be smoothly applied to measurement of the three-dimensional posture of the body with the curved surface. The reason the number of individuals is set to the above-described range is because if the number of individuals is less than two kinds, a crossing-over based on the genetic algorithm cannot be made and the genetic algorithm itself does not establish. The reason the number of individuals is set to less than 1000 kinds is because if the number of individuals is too many, it takes very long to perform computations. Thus in consideration of the balance between computation accuracy and computation efficiency, the number of individuals is preferably in the range of 10 kinds to 100 kinds.

In computations based on the genetic algorithm, the numerical value of each of the six variables is converted from a decimal number into not less a 5-bit binary number nor more than a 20-bit binary number by setting one digit of the binary number to one bit.

Computations can be easily performed by converting the coding of the variables from the decimal number into the binary number. The reason the number of bits is limited to the above-described range is because if the number of digits is less than five bits, the decimal number has a few significant figure before it is converted into the binary number, and thus the three-dimensional posture of the body with the curved surface is measured with a low degree of accuracy. On the other hand, if the number of digits is more than 20 bits, a computer has a high load in its computing processing. Thus it takes long for the computer to perform computations. In consideration of the balance between computation accuracy and the load to be applied to the computer in its computation processing, the number of digits is preferably 8 to 12 bits. In the case where the number of bits of each variable is set to the above-described range, the number of bits (length of chromosome) of the individual is in the range of 30 bits to 120 bits.

The present invention provides a method of measuring a three-dimensional posture of a body with a curved surface, wherein computations based on a genetic algorithm include the steps of performing a first-time posture displacement operation corresponding to a first generation for each of individuals, based on a given numerical value of six variables of each of the individuals; computing a goodness-of-fit from a function on the distance between each mark on the surface of the posture-displaced imaginary body with the curved surface and each mark on the surface of the body with the curved surface in a two-dimensional image in a posture displacement operation which is performed for each of the individuals; performing a reproduction by setting a probability of individuals which can leave descendants to the next generation, according to a numerical value of the goodness-of-fit and by selecting individuals which can leave descendants to the next generation according to the probability; repeating the posture displacement operation for each of the individuals, computations of the goodness-of-fit, and the reproduction; terminating computations when a maximum value of the found goodness-of-fit does not change in a range of not less than 100 generations nor more than 10000 generations; and specifying an amount of the posture displacement operation at the time when the computation has terminated as the three-dimensional posture of the body with the curved surface.

As described above, the goodness-of-fit is found by using the function relating to the distance between the mark on the surface of the posture-displaced imaginary body with the curved surface and the mark, on the surface of the body with the curved surface in the two-dimensional image, corresponding to the mark of the imaginary body with the curved surface. Thereafter the existence probability of the next generation is set according to the found goodness-of-fit to select a descendant which is succeeded to the next generation according to the existence probability. That is, the larger the numerical value of the goodness-of-fit, the better the goodness-of-fit. Thus the goodness-of-fit is set on the basis of a reciprocal number of the objective function which is the sum of the squares of the distance between the mark on the surface of the imaginary body with the curved surface and the mark on the surface of the body with the curved surface in the two-dimensional image thereof. In this case, individuals each having an error-minimized solution will hold a majority of a set to be computed. Thus it is possible to find a solution which is supposed to minimize the objective function. As the method of making the goodness-of-fit and the existence probability thus found directly proportional to each other, the region of each individual is set on a roulette in correspondence to the goodness-of-fit, and a certain number of random numbers regarded as an arrow are generated. In this manner, a roulette selection of leaving an individual hit by the arrow to the next generation can be used.

The individual which can leave descendants to the next generation is selected by the roulette selection and the like, and computations are appropriately performed on the next generation including the individual generated by the reproduction such as the crossing-over and the mutation. Individuals which can leave descendants to the subsequent generations are selected according to computed results. Thereafter, these processes are repeatedly executed. If a maximum value of the goodness-of-fit obtained by the computation in the repeated execution of these processes does not change in the range from 100 generations to 10000 generations, it is considered that the variables of the individuals have converged into an optimum solution, and computations terminate. It can be determined that the displaced posture of the imaginary body with the curved surface at this point is most accurate and coincident with the posture of the body with the curved surface image in the two-dimensional image thereof. Thus the displaced posture of the imaginary body with the curved surface at this point can be specified as the coordinate value relative to the reference position. The above-described computation can be performed automatically by the computer having the program of executing the above-described computation processing.

The reason it is determined that maximum value of the goodness-of-fit has converged into an optimum solution if the maximum value of the goodness-of-fit does not change in the range from 100 generations to 10000 generations is as follows: If it is determined that the maximum value of the goodness-of-fit has converged into the optimum solution at a generation less than 100 generations, it is considered that a converged solution may diverge again. If it is determined that the maximum value of the goodness-of-fit has converged into the optimum solution at a generation more than 10000 generations, it is considered that the solution will hardly diverge again, even though computations are performed for generations higher than 10000 generations and it takes long to perform computations. Thus considering the balance between computation accuracy and the time period required for the computations, 1000 generations is most favorable to perform computations.

The present invention provides a measuring apparatus for measuring a rotational amount of a body with a curved surface and a direction of a rotational axis thereof. The measuring apparatus includes a photographing means capable of photographing the body with the curved surface in various directions; a recording means for recording a two-dimensional image of the body with the curved surface obtained by the photographing means; and a computing means for generating an imaginary body with a curved surface similar to the body with the curved surface in a three-dimensional coordinate space, specifying a three-dimensional posture of the body with the curved surface, based on the imaginary body with the curved surface and the two-dimensional image of the body with the curved surface, and computing the rotational amount of the body with the curved surface and the direction of the rotational axis thereof.

The computing means has a posture recognition program for displacing the posture of the imaginary body with the curved surface in such a way that marks on the surface of the body with the curved surface in the two-dimensional image thereof are coincident with marks on the surface of the imaginary body with the curved surface and specifying the three-dimensional posture of the body with the curved surface on the basis of an amount of an operation of displacing a posture of the imaginary body with the curved surface relative to a reference posture of the imaginary body with the curved surface.

The measuring apparatus of the present invention for measuring the rotational amount of the body with the curved surface and the direction of its rotational axis has the photographing means, the recording means, and the computing means having the posture recognition program. Therefore the measuring apparatus is most suitable for carrying out the method of measuring the rotational amount of the body with the curved surface and the direction of its rotational axis. The measuring apparatus is capable of measuring the posture of the body with the curved surface, its rotational amount, and the direction of its rotational axis with high accuracy.

It is preferable that the computing means has a computing program computing a displacement amount of the posture of the imaginary body with the curved surface relative to the reference posture thereof, based on the genetic algorithm. If the computing means has the computing program performing the above-described computation, based on the genetic algorithm, the computing means is capable of performing computations easily by carrying out the measuring method which uses the genetic algorithm with high accuracy.

It is preferable that the photographing means has a construction capable of photographing the rotating body with the curved surface at a plurality of times at predetermined intervals.

More specifically, to photograph the two-dimensional image of the actual body with the curved surface, it is necessary for the measuring apparatus to have the photographing means such as a still camera, a CCD camera or the like for capturing the image and the recording means such as a film, an image memory or the like for recording the image. In addition, micro-flashes are used to photograph an instantaneous still state of the body with the curved surface image by utilizing the difference between the luminance of one micro-flash and that of the other micro-flash when they emit light in a short period of time. In the case where the body with the curved surface moving at a speed as high as 10 m/s or more is measured, it is possible to obtain a still image without a blur occurring, by using a high-speed shutter or a micro-flash.

One or a plurality of the photographing means can be used to obtain the two-dimensional image.

To obtain a plurality of images, it is necessary to capture the image of the body with the curved surface at least twice. To do so, one camera is used and light is emitted by a micro-flash to photograph a plurality of body with the curved surfaces on one picture or photograph one body with the curved surface on each of a plurality of pictures. It is possible to use a plurality of cameras so that each camera photographs a two-dimensional image of the body with the curved surface at predetermined intervals. In this case, it is necessary to specify a coordinate axis common to the images by calibration or the like.

The following means are used to obtain the position of the mark given to the body with the curved surface on the basis of the image thereof obtained by the photographing means: In the case where a film is used as the recording means, the following methods are known: A primitive method of measuring the position of the mark by setting a scale on a developed photograph; and a method of measuring the position of the mark by setting a measuring cursor on a display screen of a computer by using an image input device such as a scanner capable of capturing the image of a film or that of a photograph into the computer. In the case where an image memory is used as the recording means, data stored in the image memory is read onto the display screen of the computer, and the position of the mark is measured with the measuring cursor. That is, so long as the two-dimensional position of each mark in the image of the body with the curved surface is obtained, the measuring method is not limited to a specific one, but any of the above-described methods can be used.

The present invention provides a method of specifying a three-dimensional posture of a body with a curved surface, comprising the steps of photographing at a certain time the body with the curved surface having a plurality of marks given to a surface thereof to obtain a two-dimensional image thereof; generating an imaginary body with a curved surface having a plurality of marks given to a surface thereof in a three-dimensional coordinate space by operating a computer; setting an arbitrary posture of the imaginary body with the curved surface as a reference posture, observing the imaginary body with the curved surface in an arbitrary viewing direction, and performing a posture displacement operation by the computer in such a way that the marks given to the imaginary body with the curved surface are coincident with the marks given to the surface of the body with the curved surface in each of the two-dimensional images; and specifying a three-dimensional posture of the body with the curved surface on the basis of an amount of a posture displacement operation, relative to the reference posture of the imaginary body with the curved surface.

It is possible to express the position and posture of the actual body with the curved surface rotating or stationary by coordinate values relative to the reference posture in the imaginary three-dimensional space by relating the posture of the imaginary body with the curved surface and that of the actual body with the curved surface to each other. Consequently it is possible to analyze the rotational amount of the body with the curved surface and the direction of its rotational axis by using images obtained by photographing the body with the curved surface at predetermined intervals. By using images of the body with the curved surface obtained by photographing it at a certain time, it is also possible to measure the posture of the body with the curved surface such as an orientation thereof at a time. Thereby it is possible to specify the posture of the golf club head at the time of an impact and immediately before the impact.

BRIEF DESCRIPTION OF THE DRAWINGS

FIG. 6 shows an imaginary golf club head formed in an imaginary three-dimensional coordinate space.

FIG. 9 shows an ellipsoid to which marks are given.

DETAILED DESCRIPTION OF THE PREFERRED EMBODIMENTS

The embodiments of the present invention will be described below with reference to drawings.

Figure 1A:
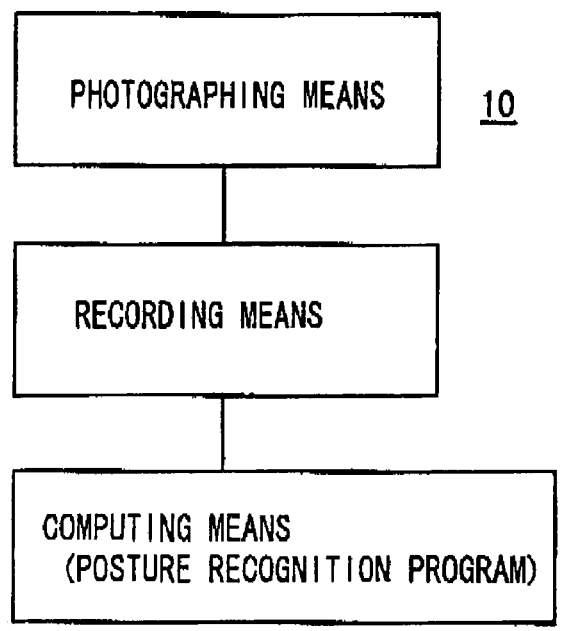
FIG. 1A shows the construction of a measuring apparatus of the present invention for measuring a rotational amount of a body with a curved surface and the direction of its rotational axis.

FIG. 1A shows the construction of an apparatus 10 for carrying out the method of the present invention of measuring a rotational amount of a body with a curved surface and the direction of its rotational axis.

The measuring apparatus 10 includes a photographing means capable of photographing the body with a curved surface in various directions; a recording means for recording a two-dimensional image of the body with a curved surface obtained by the photographing means; and a computing means for generating an imaginary body with a curved surface similar to the body with a curved surface in a three-dimensional coordinate space and specifying a three-dimensional posture of the body with a curved surface based on the imaginary body with a curved surface and the two-dimensional image of the body with a curved surface to thereby determine the rotational amount of the body with a curved surface and the direction of the rotational axis thereof.

The computing means has a posture recognition program for displacing the posture of the imaginary body with the curved surface in such a way that marks on the surface of the body with the curved surface in the two-dimensional image thereof are coincident with marks on the surface of the imaginary body with the curved surface and specifying the three-dimensional posture of the body with the curved surface on the basis of an amount of an operation of displacing a posture of the imaginary body with the curved surface relative to a reference posture of the imaginary body with the curved surface.

Figure 1B:
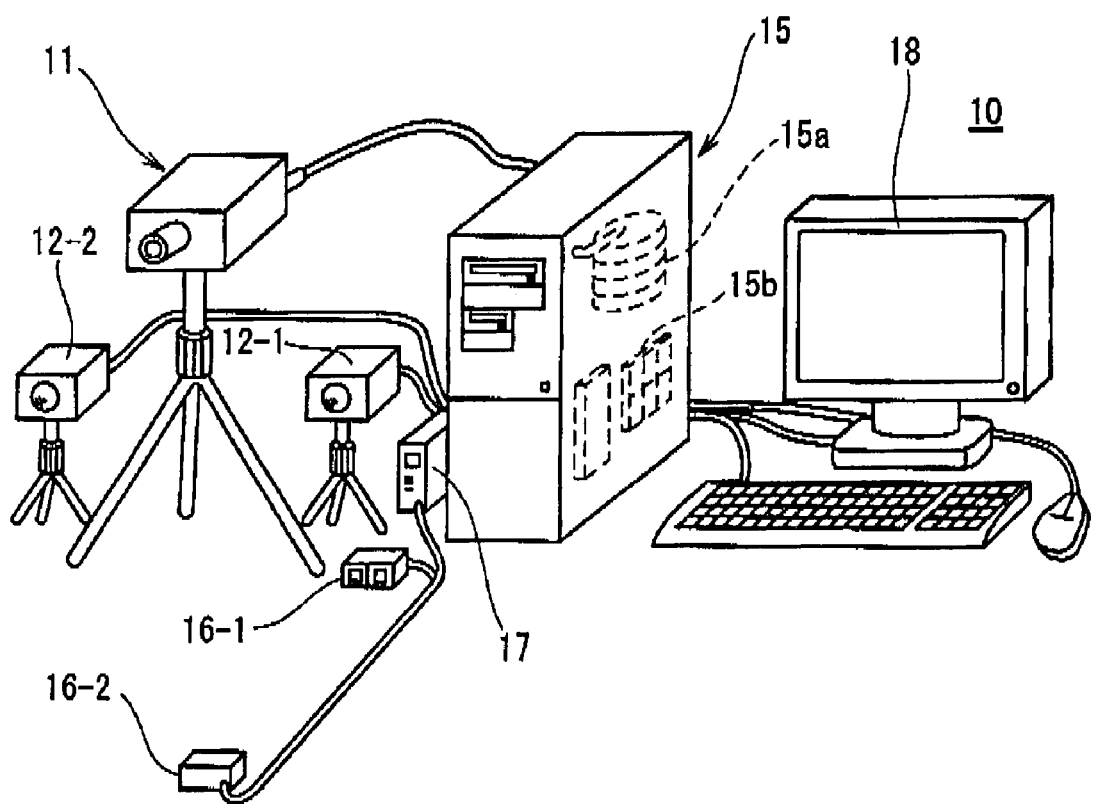
FIG. 1B is a schematic perspective view showing the measuring apparatus.

As shown in FIG. 1B, in the measuring apparatus 10, a CCD camera 11 and two micro-flashes 12-1, 12-2 are used as the photographing means. The body with a curved surface to be measured is photographed by the CCD camera 11. An image memory 15b serving as the recording means stores data of images obtained sequentially. The image memory 15b is disposed inside the computer 15 serving as the computing means.

After the micro-flashes 12-1, 12-2 flash sequentially at a predetermined interval at the time of photographing the body with a curved surface, the storage of the image data into the image memory 15b terminates. Thereby the image memory 15b obtains a picture in which two two-dimensional images of the body with a curved surface are present. To allow the micro-flashes 12-1 and 12-2 to flash at a predetermined timing respectively, trigger signals generated by photoelectric tube switches 16-1, 16-2 are applied to the micro-flashes 12-1 and 12-2 through a retarder 17.

In addition to the image memory 15b, the computer 15 of the measuring apparatus 10 has a central processing unit (CPU), a memory, and a hard disk 15a serving as a storage device. The hard disk 15a has the posture recognition program and a computation program for computing a displaced amount of the posture of the imaginary body with a curved surface relative to the reference posture, according to the genetic algorithm.

Figure 2:
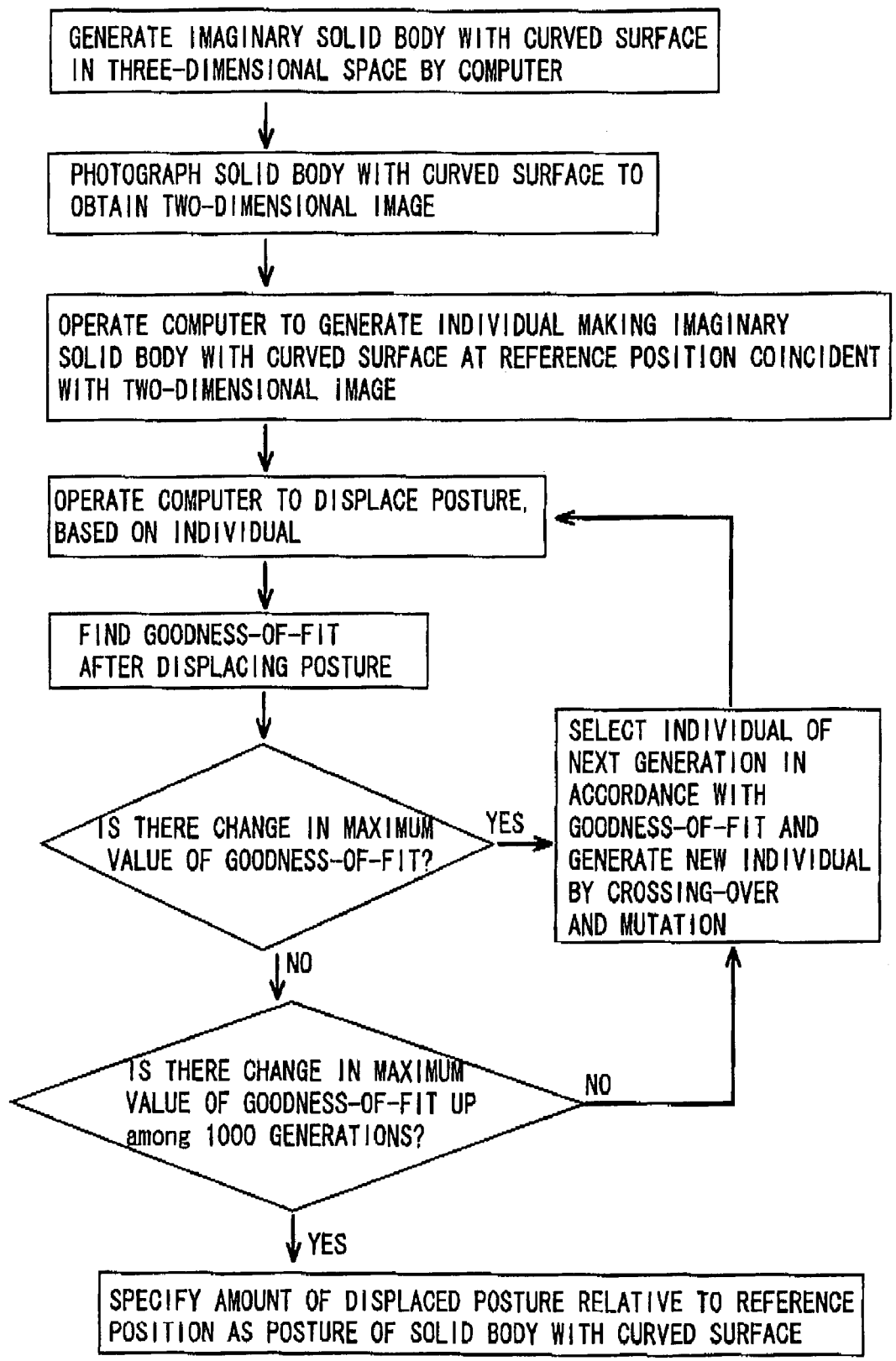
FIG. 2 is a flowchart showing the steps of specifying the posture of the body with the curved surface.

The posture recognition program is produced on the basis of the flowchart shown in FIG. 2. The posture recognition program includes a plurality of steps of forming the imaginary body with the curved surface in the imaginary three-dimensional space on the basis of the body with the curved surface to be measured in its rotational amount and the like; allowing the operation of displacing the posture of the imaginary body with the curved surface to be performed, namely, allowing the operation of magnifying, minifying, moving, and rotating the posture thereof to be performed; and specifying the displacing operation of making the imaginary body with the curved surface viewed in an observation direction coincident with the posture of the body with a curved surface in the photographed two-dimensional image.

For example, the posture recognition program is used to form the imaginary body with the curved surface similar to the actual body with the curved surface to be measured in its rotational amount and the like; give marks to the surface of the imaginary body with a curved surface as in the case of the actual body with the curved surface to be measured in its rotational amount and the like; set an arbitrary posture of the formed imaginary body with the curved surface as the reference posture; and set the direction in which the imaginary body with the curved surface set as the reference posture is observed. Thereafter the computer 15 executes the operation of magnifying, minifying, moving, and rotating the posture of the imaginary body with the curved surface appropriately so that the posture of the imaginary body with the curved surface is coincident with that of the image of the photographed body with the curved surface to be measured in its rotational amount and the like.

In addition to the above-described processing, the operation of the computer includes binarizing processing, namely, the operation of displaying the two-dimensional image of the body with the curved surface in white and black.

A displacement amount of the imaginary body with the curved surface in the posture displacement operation is programmed in the computation program of performing computations according to the genetic algorithm. The three-dimensional posture of the body with the curved surface is specified for each photographed two-dimensional image thereof in finding the rotational amount thereof and the direction of its rotational axis.

Figure 3:
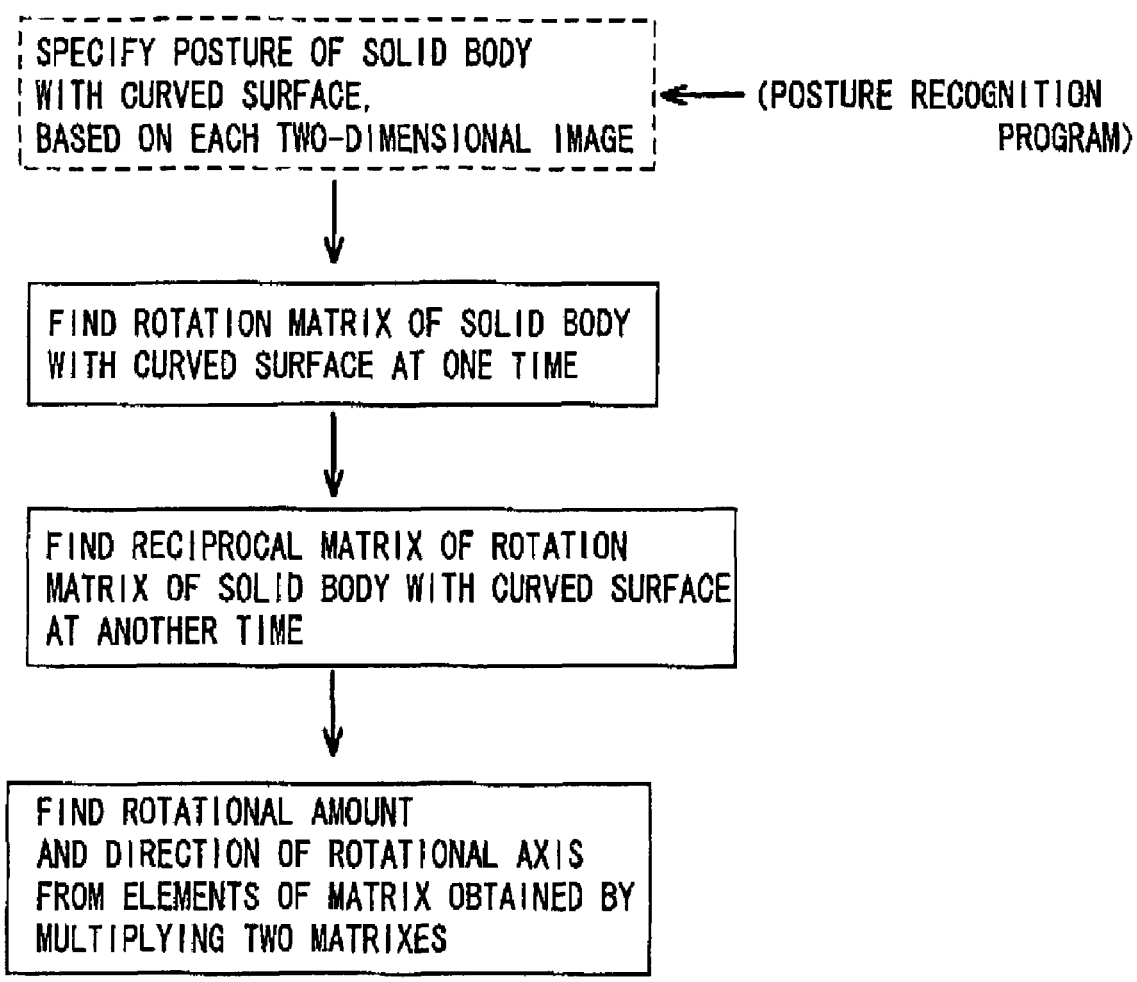
FIG. 3 is a flowchart showing the computing steps for measuring the rotational amount of the body with the curved surface and the direction of its rotational axis.

The above-described computing means is recorded in the hard disk 15a of the computer 15 in the form of the program. The program for the computing means is produced on the basis of the flowchart shown in FIG. 3.

The method of measuring measures the rotational amount of the body with the curved surface and the direction of its rotational axis to be carried out by the measuring apparatus 10 is described below in detail.

Figure 4A:
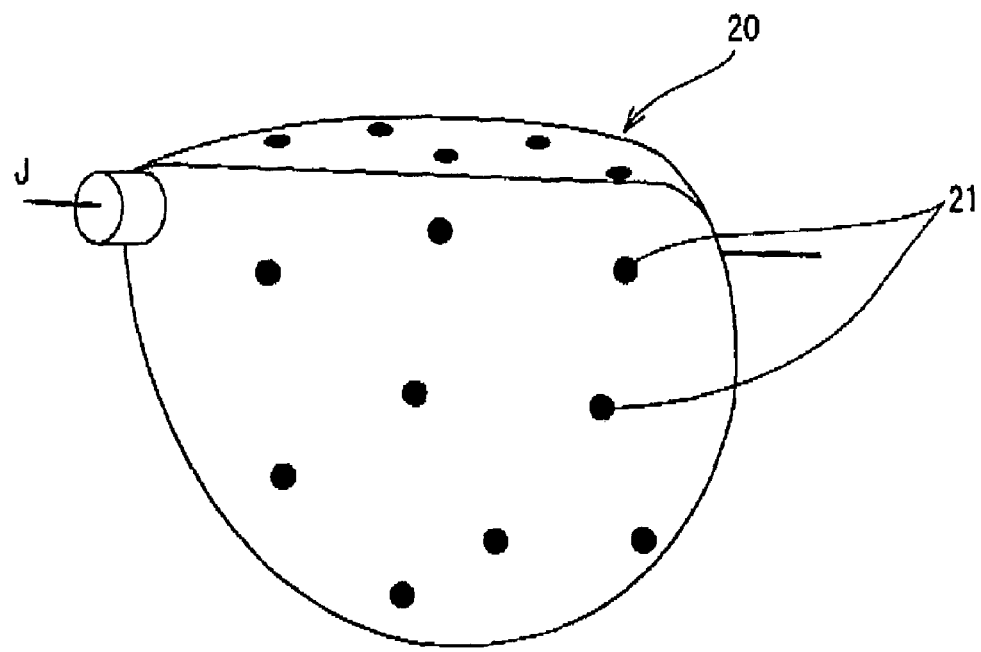
FIGS. 4A and 4B show positions of marks given to the body with the curved surface.
Figure 4B:
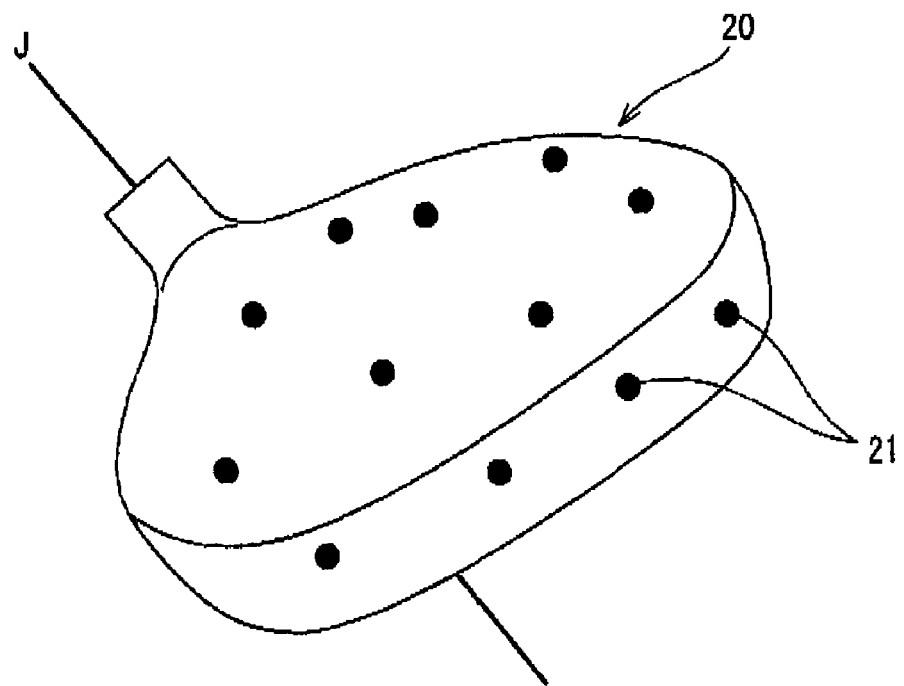

A golf club head is used as the body with the curved surface to be measured in its rotational amount and the like. Initially, before a measuring operation is performed, as shown in FIGS. 4A and 4B, a large number of black marks 21 are given to the surface of a golf club head 20.

In this case, the marks 21 are so given as to allow them to be symmetrical once with respect to a rotational axis J of the golf club head 20, when the golf club head 20 rotates on the rotational axis J at an angle obtained by dividing 360° by one. That is, the golf club head 20 becomes symmetrical once with respect to the rotational axis J in the operation of rotating it. The marks 21 are given to the surface of the golf club head 20 at random. The rotational axis J of the golf club head 20 is coincident with the axis of a golf club shaft.

Figure 5:
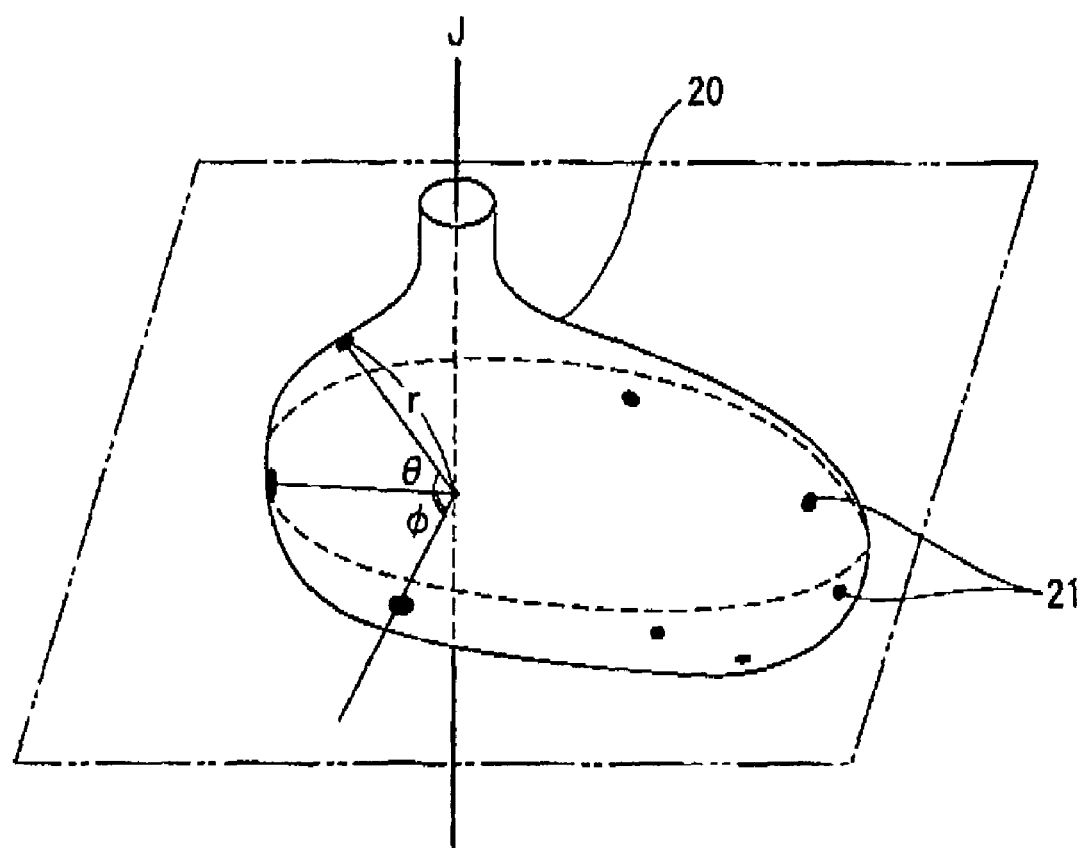
FIG. 5 is a schematic perspective view showing the relationship between a golf club head and marks.

The three-dimensional coordinate value of each mark 21 given to the surface of the golf club head 20 in the above-described manner is read with a three-dimensional measuring device and the like. As the coordinate for reading the three-dimensional coordinate value of each mark 21, a polar coordinate (coordinate value r in radial direction, angle θ in meridian direction, and angle φ in azimuth direction) is adopted, as shown in FIG. 5.

As shown in FIG. 6, the operation of the posture recognition program disposed inside the computer 15 is operated to form an imaginary golf club head 30 similar to the golf club head 20 in an imaginary three-dimensional coordinate space S of a display screen 18 of the computer 15 and give marks 31 to the surface of the imaginary golf club head 30 at positions corresponding to the read numerical values of the marks 21 of the golf club head 20 on the polar coordinate (r, θ, φ). In the posture recognition program, computations are performed by converting polar coordinate values into rectangular coordinate values. In the posture recognition program, a given posture of the imaginary golf club head 30 thus formed is set as the reference posture, and the direction in which the imaginary golf club head 30 is observed is set.

Figure 7A:
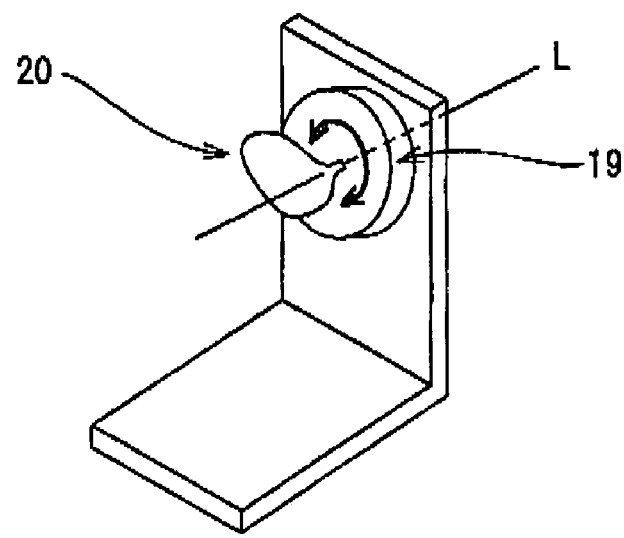
FIG. 7A is a schematic view showing a rotation apparatus.

As shown in FIG. 7A, the CCD camera 11 is set at a position where the CCD camera 11 is capable of photographing the golf club head 20 while it is rotating by a rotation apparatus 19. The distance between the CCD camera 11 and the golf club head 20 is appropriately adjusted. The magnification of the lens of the CCD camera 11 is also appropriately adjusted.

Figure 7B:
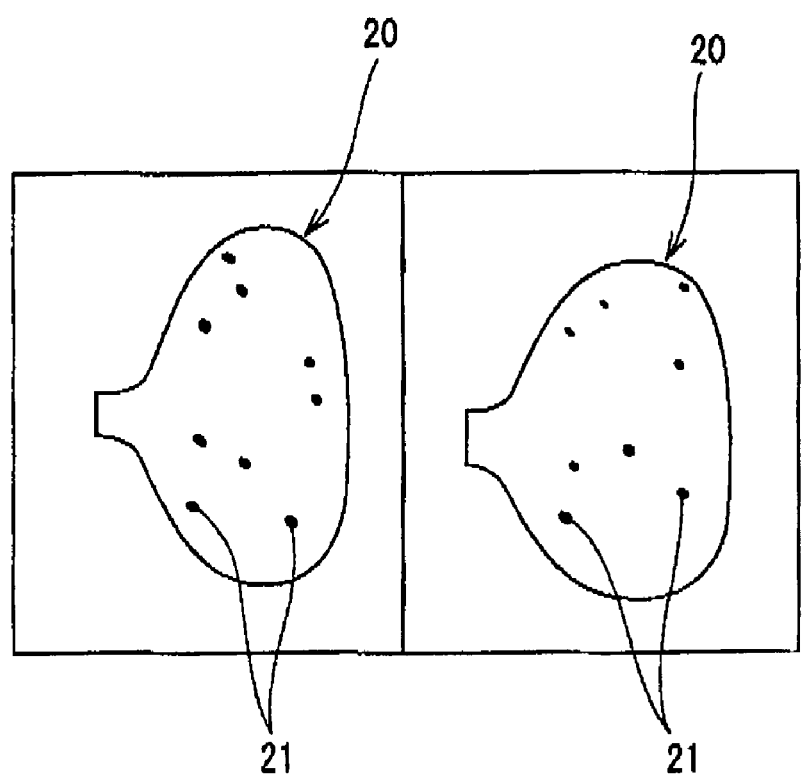
FIG. 7B shows a two-dimensional image of an actual golf club head.

In the above-described disposed state of the CCD camera 11, the micro-flashes 12-1, 12-2 emit respectively at a predetermined interval, when the golf club head 20 passes the CCD camera 11. Thereby the image memory 15b obtains a still picture in which two two-dimensional images of the golf club head 20 are present. FIG. 7B shows the obtained two-dimensional images. The image data obtained by photographing the golf club head 20 is converted into binary data of white and black by using the binarizing program. Thereafter, on the display screen 18, the two-dimensional coordinate value of each mark 21 is read. Read values are recorded on the hard disk 15a.

As described above, the operation of magnifying, minifying, moving, and rotating the posture of the imaginary golf club head 30 is performed in such a way that the mark 31 on the surface of the imaginary golf club head 30 is coincident with the mark 21 on the surface of the golf club head 20 in each two-dimensional image thereof. Thereby the posture of the imaginary rolf club head 30 relative to the reference posture thereof is specified. The amount of the operation of magnifying, minifying, moving, and rotating the posture of the imaginary golf club head 30 is computed by using the genetic algorithm which is one of the optimizing methods. By specifying the three-dimensional posture of the body with the curved surface at a given time, it is possible to recognize the posture thereof by using only one image thereof obtained by photographing it at the given time. For example, the three-dimensional posture of the golf club head at a face angle thereof can be found by using only one image. The recognition of the three-dimensional posture of two images of the golf club head obtained by photographing it at a certain interval allows analysis of the rotational amount thereof and the direction of a rotational axis thereof and the like. Although the three-dimensional posture of the rotating body with the curved surface is specified in the embodiment, it is possible to photograph the stationary body with the curved surface at a certain time and recognize the three-dimensional posture thereof, as described above.

The optimization condition in the genetic algorithm of the embodiment is shown below.

The following items are set as the design variables: rotation angles (α, β, γ) around each axis of the three-dimensional rectangular coordinate; a scale Z which is a variable of magnification and minification; and a coordinate value $(U_o, V_o)$ of the center of gravity of the imaginary golf club head 30.

Numerical values of these six items are set as six variables. Numerical values obtained by converting the six variables into a 10-bit binary number is used as the code.

Fundamental set values in the optimization to be obtained by the genetic algorithm of the embodiment are shown below:

| | |
|---|---|
| Number of individuals: | 50 |
| Length of chromosome: | 60 bits |
| Number of design variables: | six (10 bits per variable) |
| Termination condition: | (terminates if maximum value of goodness-of-fit does not change among 1000 generations) |
| Number of marks: | 26 |

Pattern matching is executed between a two-dimensional projection drawing obtained by performing the above-described operation by the computer and a photographed two-dimensional projection drawing. A degree of similarity of a pattern at this time is defined by an equation (1) shown below. The equation (1) is set as an objective function. A maximum value of the objective function is searched by using the genetic algorithm.

[Equation 1] (1)

$$f = \sum_{i=1}^{n} \min j\{(\text{distance}(Ai, Bj)^2)\}$$

where n is the number of marks.

In the equation (1), Ai is the two-dimensional coordinate (origin is center coordinate of body with curved surface) of a mark of the photographed projection drawing obtained; Bj is the two-dimensional coordinate (origin is center coordinate of body with curved surface) of the mark of the of the projection drawing obtained after the golf club head 20 is rotated according to a value obtained by the genetic algorithm; distance (Ai,Bj) is the distance between the two points (Ai, Bj); minj is a minimum value for j (j=1 to n, n is the number of marks), and Σ is the summation for i (i=1 to n, n is the number of marks).

The computation of the objective function is performed for each of the individuals to find the goodness-of-fit of each individual.

The computer 15 repeatedly executes computations for finding the goodness-of-fit. When the maximum value of the goodness-of-fit remains unchanged among 1000 generations in the computation, the computation terminates. The values of the six variables of an individual which maximizes the goodness-of-fit are determined as an optimum solution of the posture displacement of the imaginary golf club head 30. The three-dimensional posture of the golf club head 20 is specified by the individual. Another method may be used to finish the simulation of alternation of generations to be executed by using the genetic algorithm.

The rotation of a point on the three-dimensional coordinate is obtained by the product of a rotation matrix of 3×3 and the coordinate of the point. The rotation matrix is obtained when the value of α, β, and γ is determined. Thus by finding the rotation matrix, it is possible to determine the rotational amount of the golf club head with respect to the reference position in each image. In computations for optimization, the golf club head is rotated by varying the value of α, β, and γ (rotational angle) in such a way as to minimize a deviation between the golf club head and the photographed image.

The rotation matrix of each image can be obtained by the above-described method. To find the difference between the rotational amount of one image and that of the other image, the rotation matrix of one image should be multiplied by a inverse matrix of the rotation matrix of another image. Based on the rotation matrix obtained thus, a vector of the rotational axis and a rotational angle are computed.

More specifically, based on the values of the rotational angles (α, β, γ) around the X-axis, the Y-axis, and the Z-axis of the three-dimensional coordinate space of the individual which maximizes the goodness-of-fit, a rotation matrix of three rows and three columns is found. The found rotation matrix is the matrix which determines the posture of the golf club head 20. That is, rotation matrixes Rx, Ry, and Rz for rotating the golf club head 20 around the X-axis, the Y-axis, and the Z-axis respectively are expressed as follows:

[Equation 2] (2)

$$Rx = \begin{pmatrix} 1 & 0 & 0 \\ 0 & \cos\alpha & -\sin\alpha \\ 0 & \sin\alpha & \cos\alpha \end{pmatrix}$$

$$Ry = \begin{pmatrix} \cos\beta & 0 & \sin\beta \\ 0 & 1 & 0 \\ -\sin\beta & 0 & \cos\beta \end{pmatrix}$$

$$Rz = \begin{pmatrix} \cos\gamma & -\sin\gamma & 0 \\ \sin\gamma & \cos\gamma & 0 \\ 0 & 0 & 1 \end{pmatrix}$$

The rotation matrix R for specifying the posture of the golf club head 20 specified by the posture recognition program on the basis of the reference posture of the imaginary body with the curved surface is expressed as follows by the rotation matrixes Rx, Ry, and Rz for rotating the golf club head 20 around the X-axis, the Y-axis, and the Z-axis respectively:

[Equation 3]

$$R = Rz\ Ry\ Rx \quad (3)$$

Computations and evaluations of the goodness-of-fit for other images of the golf club heads 20 similar to those described above to find a rotation matrix from rotational angles (α', β', γ') specifying the posture golf club heads 20.

As described above, supposing that a rotation matrix for specifying the posture of the golf club head 20 at one time specified by the equation (3) is R1, a rotation matrix for specifying the posture thereof at another time is R2, and a rotation matrix for making the posture thereof at one time coincident with the posture thereof at another time is R12, a rotation matrix R12 is found by an equation (4) shown below:

$$R_{12} = R_2 R_1^{-1} \quad (4)$$

$$= \begin{pmatrix} r_{11} & r_{12} & r_{13} \\ r_{21} & r_{22} & r_{23} \\ r_{31} & r_{32} & r_{33} \end{pmatrix}$$

where $r_{11}$ through $r_{33}$ are elements of matrix.

Figure 8:
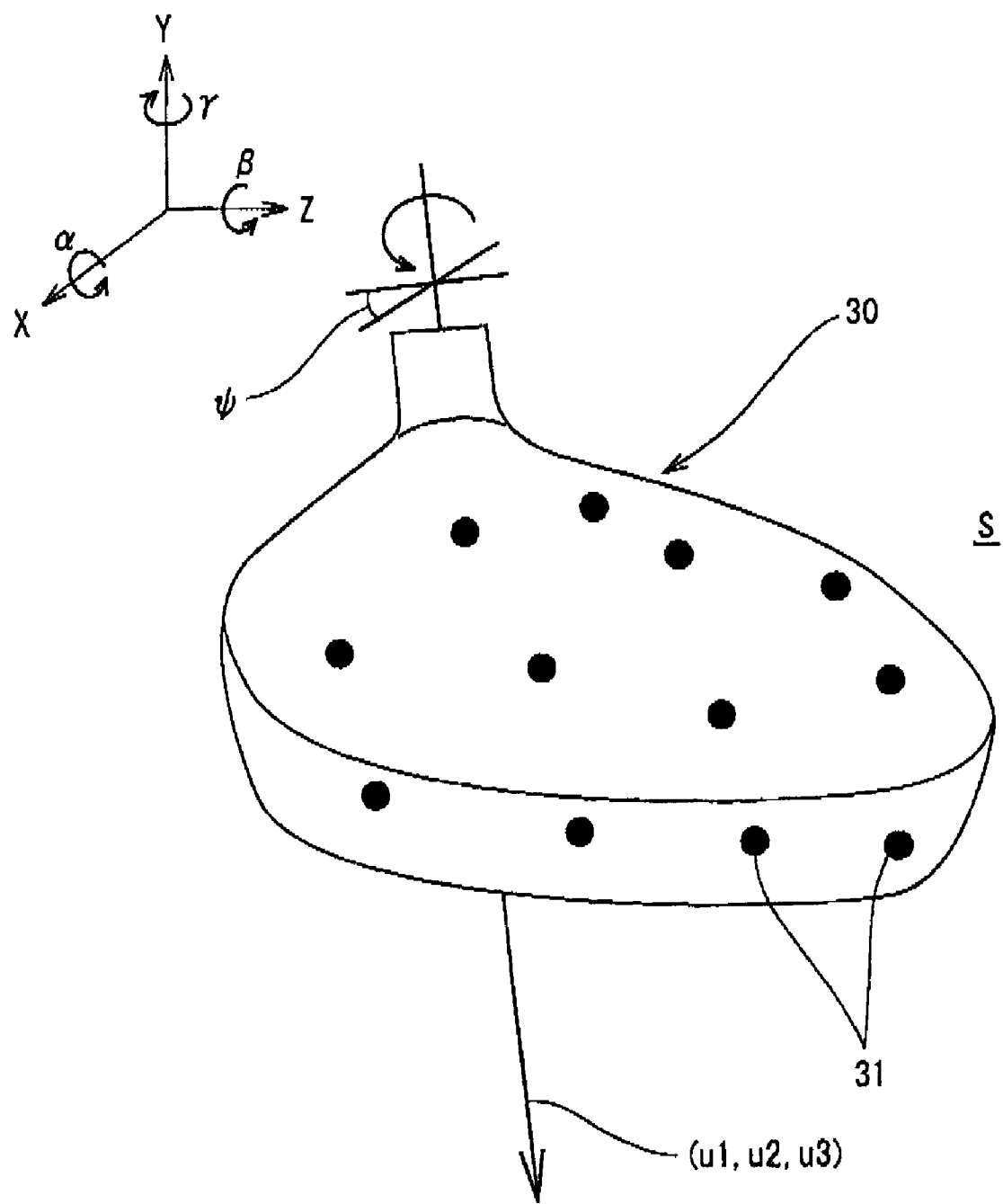
FIG. 8 is an explanatory view showing the direction of the rotational axis of the body with the curved surface and its rotational angle.
Figure 10A:
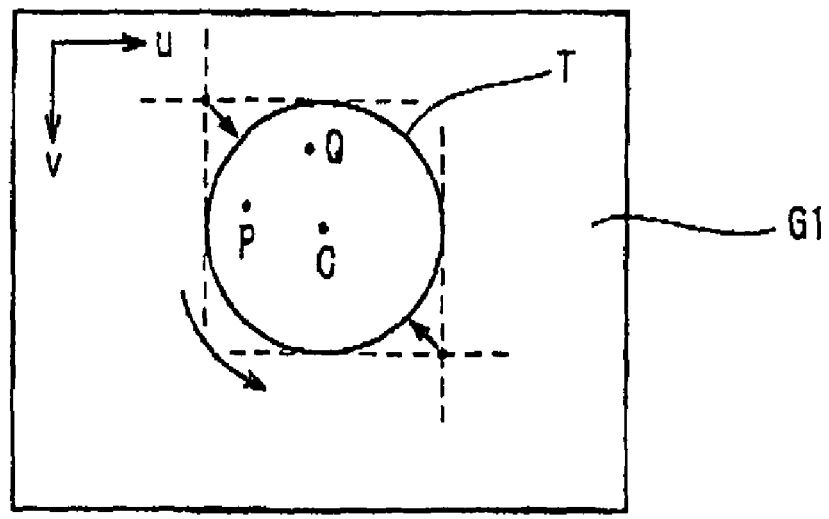
FIGS. 10A and 10B show a two-dimensional ball image respectively to be used in a conventional measuring method.
Figure 10B:
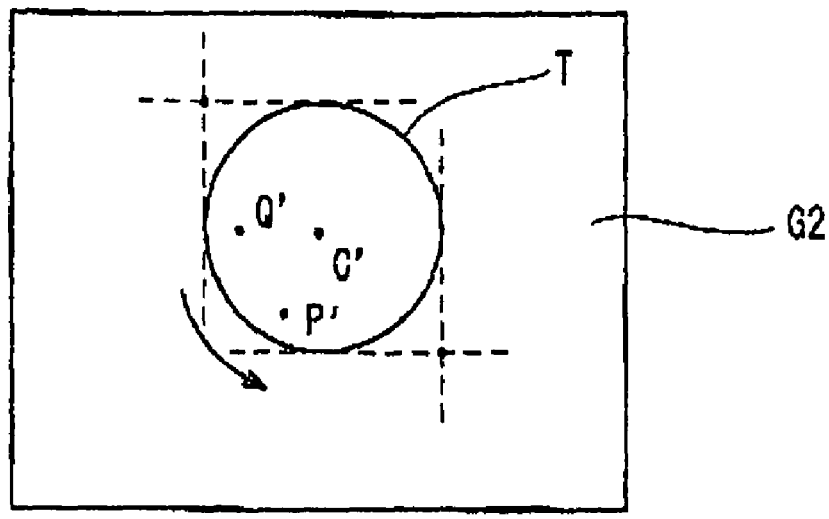
Figure 11A:
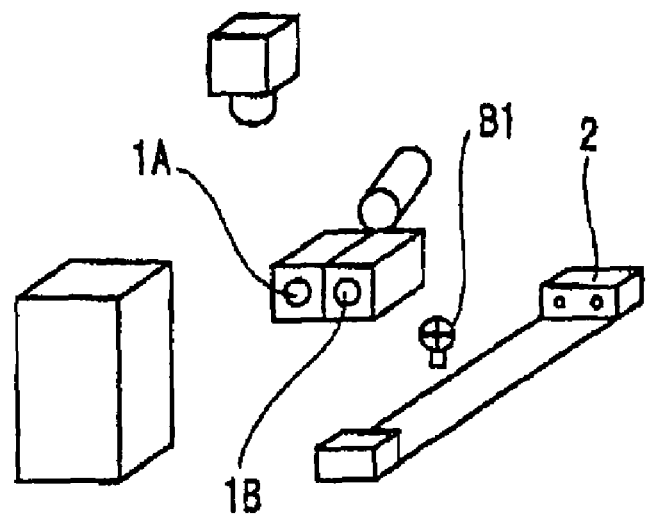
FIG. 11A is a schematic view showing a conventional measuring apparatus.
Figure 11B:
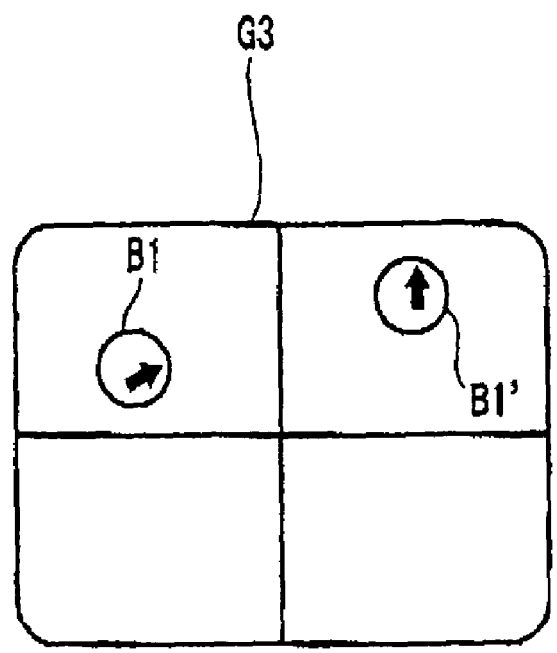
FIG. 11B shows a ball image provided by the measuring apparatus shown in FIG. 11A.
Figure 12A:
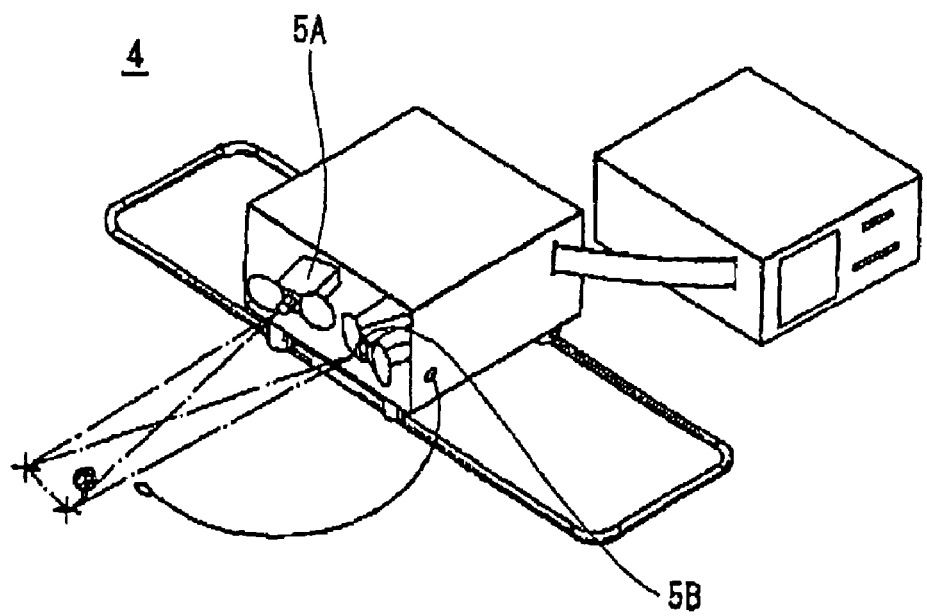
FIG. 12A is a perspective view showing another conventional measuring apparatus.
Figure 12B:
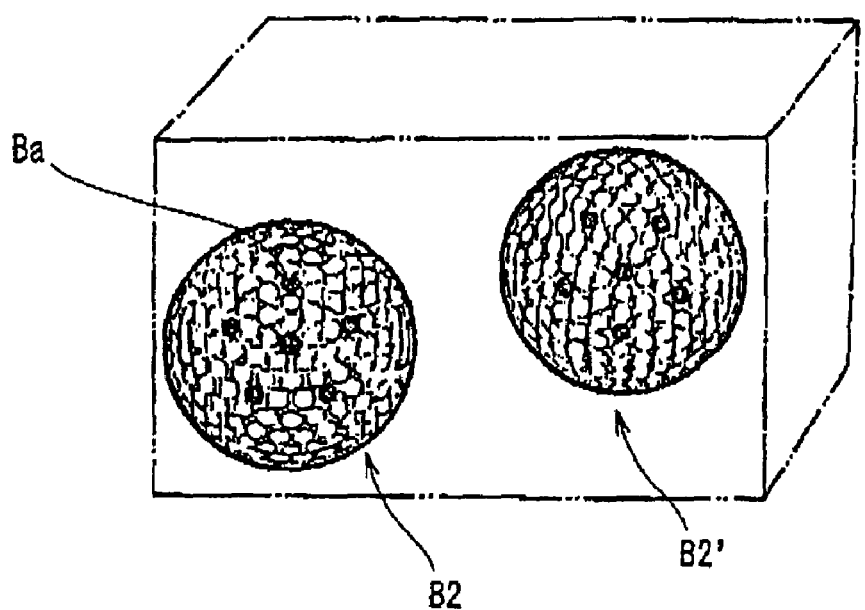
FIG. 12B is a perspective view of the three-dimensional region showing a golf ball that has passed through a measuring region.
Figure 13:
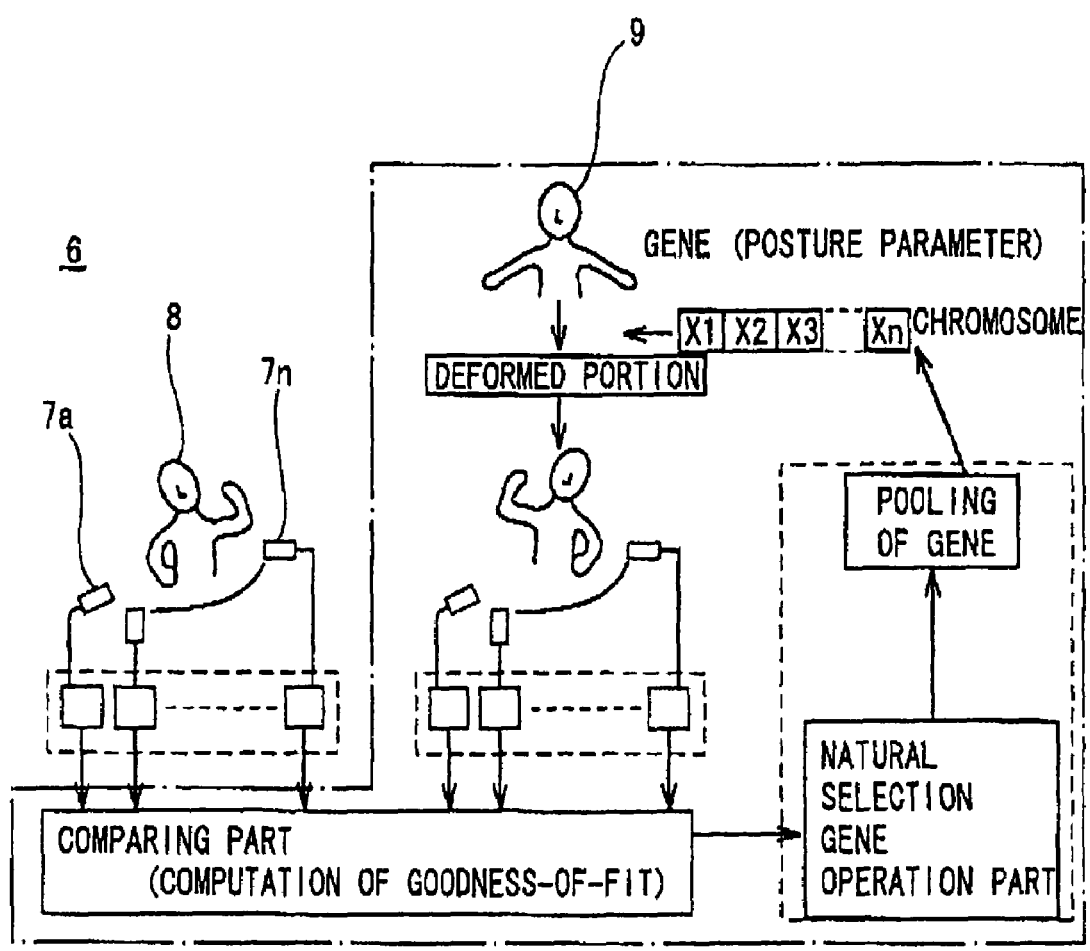
FIG. 13 is a schematic view showing a conventional posture detection apparatus using a genetic algorithm method.

Directions (u1, u2, u3) of the rotational axis (coordinate axis) and a rotational angle Ψ at the time of a coordinate conversion shown in FIG. 8 are found by equations (5) and (6) shown below, when the rotation matrix R12 shown the equation (4) is determined:

[Equation 5] (5)

$$(u_1, u_2, u_3) = \frac{(-r_{23} + r_{32}, r_{13} - r_{31}, -r_{12} + r_{21})}{\sqrt{(r_{22} - r_{32})^2 + (r_{13} - r_{31})^2 + (r_{12} - r_{21})^2}}$$

[Equation 6] (6)

$$\psi = \cos^{-1}\left(\frac{r_{11} + r_{22} + r_{33} - 1}{2}\right)$$

The rotational amount of the golf club head 20 and the direction of its rotational axis between one time and another time are found from the obtained rotational angle Ψ thus found and the interval between the time at which one image of the golf club head 20 is photographed and the time at which the other image thereof is photographed.

To compute the rotational amount and the like among not less than two images, the rotational amount and the like between successive images are computed respectively as described above to thereby find the rotational amount and the like of the body with the curved surface successively.

In the above-described embodiment, the golf club head is used as the body with the curved surface. In addition, as shown in FIG. 9, an ellipse 40 having marks 41 given to its surface can be used as the body with the curved surface.

As apparent from the foregoing description, based on the two-dimensional image of the photographed rotating body with the curved surface, the rotational amount of the body with the curved surface and the direction of its rotational axis can be easily determined by specifying the three-dimensional posture of the body with the curved surface in the imaginary three-dimensional space by the above-described method and computing the rotation matrix regarding the rotation operation to make the three-dimensional posture of the body with the curved surface at one time coincident with the three-dimensional posture thereof at another time. Computations are performed according to the program provided inside the computer on the basis of the image of the photographed body with the curved surface. Thereby the rotational amount of the body with the curved surface and the inclination of its rotational axis can be automatically measured. Therefore it is possible to reduce time and labor greatly.

Since data of the contour of the body with the curved surface is not used in the measuring method of the present invention, it is possible to greatly improve measurement accuracy over the conventional measuring method. Accordingly the measuring method of the present invention prevents measured results from being influenced by a photographing situation, saves much time and labor in a photographing operation of finely adjusting the manner of emitting flashlight to the body with the curved surface, allows measurement to be made with high accuracy, and reduces the cost necessary for measurement.

Furthermore since the posture of the body with the curved surface can be specified from one two-dimensional image thereof, it is possible to reduce time and labor required to specify the posture thereof. In addition, the measuring method of the present invention is capable of finding the rotational amount of the body with the curved surface moving at a high speed and the direction of its rotational axis by utilizing a high-speed shutter-provided camera and a micro-flash.

What is claimed is:

1. A method of measuring a rotational amount of a body with a curved surface and a direction of a rotational axis thereof, comprising the steps of:
    photographing at predetermined intervals said rotating body with the curved surface having a plurality of marks given to a surface thereof to obtain a plurality of two-dimensional images of said body with the curved surface;
    generating an imaginary body with the curved surface having a plurality of marks given to a surface thereof in a three-dimensional coordinate space by operating a computer;
    setting an arbitrary posture of said imaginary body with the curved surface as a reference posture, observing said imaginary body with the curved surface in an arbitrary viewing direction, and performing a posture displacement operation with said computer in such a way that said marks given to said imaginary body with the curved surface are coincident with said marks given to said surface of said body with the curved surface in each of said two-dimensional images;
    specifying a three-dimensional posture of said body with the curved surface for each of said two-dimensional images thereof on the basis of an amount of a posture displacement operation, relative to said reference posture; and
    determining said rotational amount of said body with the curved surface and said direction of said rotational axis thereof by computing a rotation matrix relating to a rotation operation to be performed in making said specified three-dimensional posture of said body with the curved surface at one time coincident with said three-dimensional posture of said body with the curved surface at another time,
    wherein said posture displacement operation comprises:
    an operation of magnifying and minifying, moving, and rotating said imaginary body with the curved surface; and
    an amount of said posture displacement operation relative to said reference posture is found as an amount of said operation of magnifying and minifying, moving, and rotating said imaginary body with the curved surface by computations based on a genetic algorithm.

2. The method according to claim 1, wherein a plurality of said marks are given to a surface of said body with the curved surface, with said marks symmetrical at not more than four times with respect to a rotational axis thereof in an operation of rotating said body with the curved surface.

3. An apparatus of measuring a rotational amount of a body with a curved surface and a direction of a rotational axis thereof, comprising:
    a photographing means capable of photographing said body with the curved surface in various directions;
    a recording means for recording a two-dimensional image of said body with the curved surface obtained by said photographing means; and
    a computing means for generating an imaginary body with a curved surface similar to said body with the curved surface in a three-dimensional coordinate space, and specifying a three-dimensional posture of said body with the curved surface, based on said imaginary body with the curved surface and said two-dimensional image of said body with the curved surface, and computing said rotational amount of said body with the curved surface and said direction of said rotational axis thereof,
    wherein said computing means has a posture recognition program for displacing a posture, including magnifying, minifying, moving and rotating, of said imaginary body with the curved surface, the displacing being performed in such a way that marks on a surface of said two-dimensional image of said body with the curved surface are coincident with marks on said surface of said imaginary body with the curved surface and specifying a three-dimensional posture of said body with the curved surface on the basis of an amount of an operation of displacing a posture of said imaginary body with the curved surface relative to a reference posture of said imaginary body with the curved surface, wherein said computing means has a computing program for computing an amount of an operation of displacing a posture, including magnifying, minifying, moving, and rotating, of said imaginary body with the curved surface relative to said reference posture thereof, based on a genetic algorithm.

4. The apparatus according to claim 3, wherein said photographing means has a construction capable of photographing said rotating body with the curved surface at a plurality of times at predetermined intervals.

5. A method of specifying a three-dimensional posture of a body with a curved surface, comprising the steps of:

photographing at a certain time said body with the curved surface having a plurality of marks given to a surface thereof to obtain a two-dimensional image thereof;

generating an imaginary body with a curved surface having a plurality of marks given to a surface thereof similar to said body with the curved surface in a three-dimensional coordinate space by operating a computer;

setting an arbitrary posture of said imaginary body with the curved surface as a reference posture, observing said imaginary body with the curved surface in an arbitrary viewing direction, and performing a posture displacement operation by said computer in such a way that said marks given to said imaginary body with the curved surface are coincident with said marks given to said surface of said body with the curved surface in each of said two-dimensional images; and specifying a three-dimensional posture of said body with the curved surface on the basis of an amount of a posture displacement operation relative to said reference posture of said imaginary body with the curved surface, wherein said posture displacement operation comprises:

an operation of magnifying and minifying, moving, and rotating said imaginary body with the curved surface; and an amount of said posture displacement operation relative to said reference posture is found as an amount of said operation of magnifying and minifying, moving, and rotating said imaginary body with the curved surface by computations based on a genetic algorithm.

6. A method of measuring a rotational amount of a body with a curved surface and a direction of a rotational axis thereof, comprising the steps of:

photographing at predetermined intervals said rotating body with the curved surface having not less than 10 marks nor more than 100 marks given to a surface thereof to obtain a plurality of two-dimensional images of said body with the curved surface;

generating an imaginary body with the curved surface having not less than 10 marks nor more than 100 marks given to a surface thereof in a three-dimensional coordinate space by operating a computer;

setting an arbitrary posture of said imaginary body with the curved surface as a reference posture, observing said imaginary body with the curved surface in an arbitrary viewing direction, and performing a posture displacement operation with said computer in such a way that said marks given to said imaginary body with the curved surface are coincident with said marks given to said surface of said body with the curved surface in each of said two-dimensional images;

specifying a three-dimensional posture of said body with the curved surface for each of said two-dimensional images thereof on the basis of an amount of a posture displacement operation, relative to said reference posture; and determining said rotational amount of said body with the curved surface and said direction of said rotational axis thereof by computing a rotation matrix relating to a rotation operation to be performed in making said specified three-dimensional posture of said body with the curved surface at one time coincident with said three-dimensional posture of said body with the curved surface at another time, wherein said marks are given to a surface of said body with the curved surface, with said marks symmetrical at not more than four times with respect to a rotational axis thereof in an operation of rotating said body with the curved surface.

7. A method of specifying a three-dimensional posture of a body with a curved surface, comprising the steps of:

photographing at a certain time said body with the curved surface having not less than 10 marks nor more than 100 marks given to a surface thereof to obtain a two-dimensional image thereof;

generating an imaginary body with a curved surface having not less than 10 marks nor more than 100 marks given to a surface thereof similar to said body with the curved surface in a three-dimensional coordinate space by operating a computer;

setting an arbitrary posture of said imaginary body with the curved surface as a reference posture, observing said imaginary body with the curved surface in an arbitrary viewing direction, and performing a posture displacement operation by said computer in such a way that said marks given to said imaginary body with the curved surface are coincident with said marks given to said surface of said body with the curved surface in each of said two-dimensional images; and specifying a three-dimensional posture of said body with the curved surface on the basis of an amount of a posture displacement operation relative to said reference posture of said imaginary body with the curved surface, wherein said marks are given to a surface of said body with the curved surface, with said marks symmetrical at not more than four times with respect to a rotational axis thereof in an operation of rotating said body with the curved surface.

* * * * *